March 10, 1970 U. COLOMBO ET AL 3,499,754
PROCESS FOR PURIFYING PYRITE CINDERS BY REMOVAL
OF NONFERROUS METALS
Filed June 27, 1967

United States Patent Office 3,499,754
Patented Mar. 10, 1970

3,499,754
PROCESS FOR PURIFYING PYRITE CINDERS BY REMOVAL OF NONFERROUS METALS
Umberto Colombo, Novara, Iti Mini, Milan, and Giuseppe Sironi, Novara, Italy, assignors to Montecatini Edison S.p.A., Milan, Italy, a corporation of Italy
Filed June 27, 1967, Ser. No. 649,279
Claims priority, application Italy, June 30, 1966, 19,636/66
Int. Cl. C21b 1/00; C22b 1/00
U.S. Cl. 75—1                                        9 Claims

ABSTRACT OF THE DISCLOSURE

Described is a process for the purification of pyrite and pyrrhotite cinders for metallurgical utilization, by removal of nonferrous metals such as copper, zinc, lead, gold, silver, nickel, cadmium, cobalt, manganese and recovery thereof. The following sequence of operations is followed: (a) Heating and reduction to magnetite of the cinders by a carbonaceous fuel and air, at temperatures from 600° to 850° C.; (b) chlorination with chlorine and air, in absence of water at 650–950° C. of the hot cinders produced in (a), in a fluid-bed reactor constituted of at least two stages, wherein the chlorinating gas flows in countercurrent with respect to the cinders; and (c) wet removal of the metal chloride vapors with obtainment of aqueous solutions suitable for the recovery of the metals by conventional hydrometallurgical processes.

---

Figure 1:
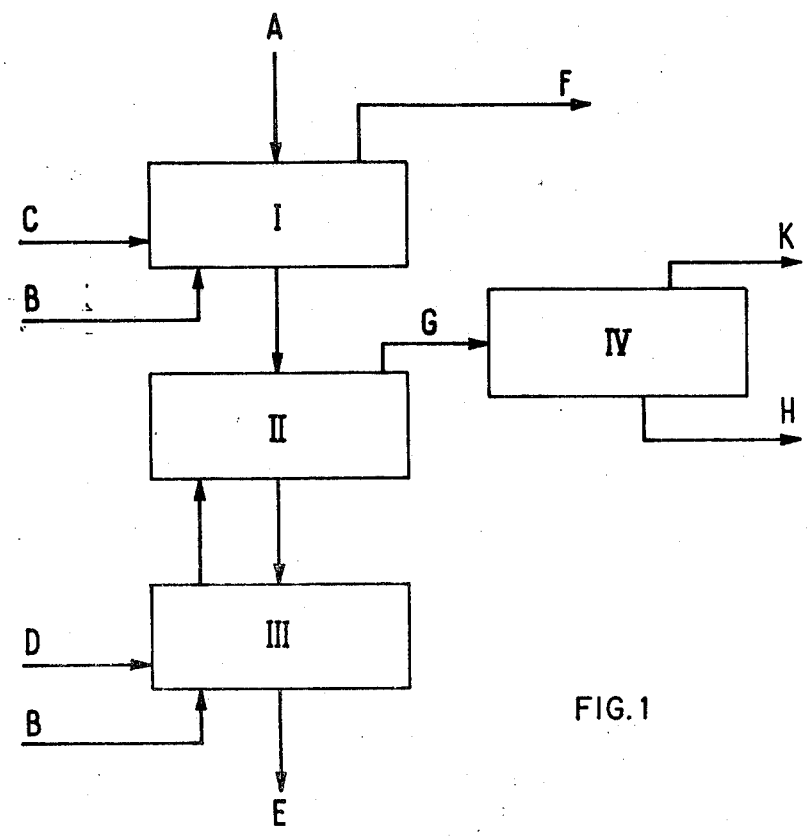

In the recent years a process for the complete utilization of pyrites has become industrially feasible. This process described in U.S. Patent No. 3,160,496 is based upon the roasting of pyrite in fluid bed with production of $H_2SO_4$ and with heat recovery as steam. The process continues the roasting of the cinders until a magnetic concentrate very rich in iron is obtained which can be pelletized.

The metallurgical value of the iron oxide pellets is very high when the iron content of said pellets is high and when nonferrous metals such as copper, zinc and lead are present in said pellets in amounts lower than 100–200 parts per million. When pyrites or pyrrhotites contain too high concentration of nonferrous metals, these nonferrous metals are also present in the cinders and must therefore be eliminated before it is metallurgically possible to utilize said cinders. In the past, methods have been set up in which the nonferrous metals were transformed into chlorides or sulphates. These salts were leached with an acid solution, which is followed by the recovery of the metals by a hydrometallurgical treatment. Such processes, however, because of the high plant cost and the extremely high operating costs, and severe corrosion problems are convenient only when large amounts of valuable metals are present.

Recent literature describes experimental works relating to the elimination of the nonferrous metals by means of volatilization of the chlorides of said metals at high temperatures. The transformation of the metal oxides into chlorides can take place by utilizing both chlorine (suitably diluted with air or oxygen) and calcium chloride or magnesium chloride.

Among the various methods for purifying this type of pyrite cinders, greater success seems to have been encountered in a method based on the treatment of the iron oxides, already agglomerated in pellets, with chlorine or alkali-earth chlorides, in shaft furnaces. The main inconvenience of this process is that, in order to obtain good results from the points of view of the purification from the nonferrous metals and of the production of pellets possessing sufficient mechanical strength and being also completely desulphurized, it is necessary to operate the chlorinating baking of the pellets in industrial units having little capacity. Furthermore, since fuel oil is utilized (generally injected directly into the shaft furnace), for the baking of pellets, the elemination of the nonferrous metals is very difficult due to the hydrolysis of the chlorides, and particularly copper and zinc chlorides.

The purification processes by volatization of the nonferrous chlorides, which are based on the use of fluid-bed reactors, appear certainly more interesting. It is a known fact that it is very difficult to purify satisfactorily, by the known art, the pyrite cinders from the nonferrous metals by operating in fluid beds with continuous feedings and discharges. Moreover, if one wants to keep the reaction temperature at the level required to get satisfactory kinetic conditions, it is necessary to use fuels which when containing hydrogen give rise to the aforementioned inconvenience and, when consisting of coke, result in excessive costs.

For these reasons, there has been to date no industrial assertion of the processes for the purification of pyrite cinders based on the employment of fluid-bed reactors.

We have found that it is possible to purify pyrite cinders by removal of nonferrous metals such as Cu, Zn, Pb, Au, Ag, Ni, Co, Cd and Mn, by appropriately operating with a plant based on the succession of several fluid beds, in which particular steps of the process take place.

The process which forms the object of the present invention permits, on the one hand, to obtain iron oxide cinders practically without nonferrous metal impurities which are undesirable in iron metallurgy and, on the other hand, to recover the chlorides of the above-mentioned nonferrous metals which can be transformed into metals or into oxides or salts having high commercial value, thus contributing to the overall economy of the process. The present process utilizes as fuel, natural gas or fuel of little valuable petroliferous products since, as will be described hereinafter, the combustion products and the chlorine containing gases are never contemporaneously present.

Figure 2:
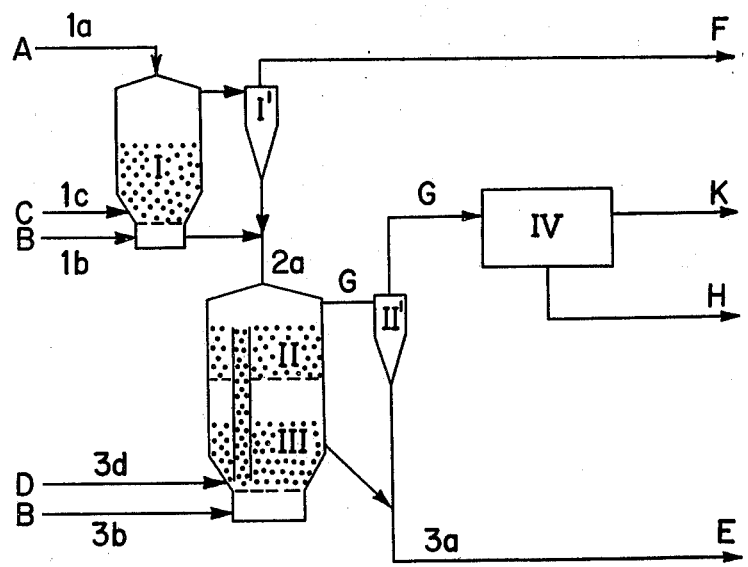

In the drawing:
FIG. 1 schematically shows our process for treating pyrite cinders; and
FIG. 2 shows an embodiment of our process.

The schematic illustration of FIG. 1 shows the following operations:
(I) Heating and reduction (partial or total) of the pyrite cinders A in fluid bed with direct injection of fuel C and air B. The hot gases F are sent to heat recovery.
(II) First stage chlorination in fluid bed, in which stage reoxidation of the cinders coming from I also occurs.
(III) Second stage chlorination in fluid bed of the cinders coming from II, by chlorine D and air B. The purified cinders E are sent to further operations.
(IV) Washing of the gases G with aqueous solution to remove the chlorides of the nonferrous metals. The solution of the chlorides H goes to the recovery of the metals. The exhaust gases K are discharged to the atmosphere.

The pyrite cinders to be purified, which optionally can be taken directly at high temperature from a pyrite roasting furnace, are sent to stage I where they are heated and subjected to a more or less intensive reduction to magnetite by means of direct injection of fuel and air into the same reduction fluid bed. It is evident that the amount of fuel to be employed will be higher when cold and moist cinders are utilized, since the reduction takes place at a temperature not lower than 600° C.

The cinders reduced in I, containing a small amount of carbon black, are continuously transferred to stage II where they are fluidized by a gas, coming from III, containing a not very strong concentration of chlorine and an excess of air. The reoxidation of the cinders and the combustion of carbon black take place with evolution of heat, which as a function of the reduction degree reached in I, more or less strongly raises the temperature of the reaction bed. It is thus possible, in this stage, to reach temperatures at which, also with low chlorine concentrations, it is possible to chlorinate the nonferrous metals contained in the cinders. Thus, we can send to discharge a gas G containing the metal chloride vapors and having very poor content of free chlorine.

The cinders partially purified in II are continuously discharged to the second chlorination stage III. Here the cinders, still at very high temperature, are fluidized with a mixture of chlorine and air, in which the chlorine is found in maximum concentration. It is thus possible, notwithstanding the low content of residual nonferrous metals in the cinders, to purify further the latter in a satisfactory way. While the gases discharged from III are sent to II, the residual cinders can be cooled and pelletized. Should the iron content of the ciners not be sufficiently high to obtain pellets or high quality sinter, the cinders can be subjected to a magnetizing reduction (if desired, in a fluid-bed reactor) and thereafter to a magnetic enrichment preceding the stage of final agglomeration. If the cinders should contain excessive contents of arsenic, one can eliminate this element during the magnetizing reduction which follows the chlorinating treatment herein described.

The temperature at which the chlorinating purification of the cinders is performed is between 650 and 960° C. and depends both on the content of impurities and on the type of pyrite as well as on the degree of distribution of the nonferrous metals in the cinders which determines the kinetics of the chlorination. Consequently, the temperature which must be reached in state I and the reduction degree to which the cinders must be brought in this stage, depend as well on the characteristics of the pyrite. By way of indication, it is sufficient to preheat to 600–700° C. and to reduce the cinders by 50–80% with respect to the total conversion of $Fe_2O_3$ into $Fe_3O_4$. More generally, the preheating is carried out by bringing the cinders up to temperatures comprised between 600° and 850° C., whereas the reduction is performed in a measure comprised between 20 and 100%, as referred to the total conversion of $Fe_2O_3$ into $Fe_3O_4$. Obviously, both the preheating and the reduction will be more or less intensive, also depending on the dimensions of the plant, as a consequence of the higher or lower heat losses.

One of the important features of our process is that the heat supplied in II comes from the oxidation of $Fe_3O_4$ to $Fe_2O_3$ and the combustion of carbon black. This allows achieving the chlorination under conditions in which only the iron chloride is retransformed into oxide, whereas the chlorides of the nonferrous metals remain such and volatize together with the discharge gas.

It is thus possible to use for the practical embodiment of this process, chlorine amounts equal to 105–120% of the stoichiometric amount relative to the conversion of the nonferrous metals into chlorides and, moreover, to utilize the same chlorine diluted in air at relatively low concentration (lower than 20%). The chlorination in two stages moreover permits on the one hand, to utilize fully the chlorine and, on the other hand, to discharge from stage III completely purified cinders, even after not very long reaction times (in the order of 0.5–2 hours in all). Furthermore, the air which is fed to stage III, can be preheated (optionally by heat exchange with the discharge gases of I and with the purified hot cinders). In this way the heat balance of the process results in being even more favorable and the difference in temperature between II and III is much smaller, with the consequence of more favorable kinetic conditions for the final chlorination.

The operations of stages II and III may be carried out together (in one single step) if only a little amount (concentration of nonferrous metals to be removed is present in the cinders.

FIG. 2 shows the scheme of a possible embodiment of the process according to the present invention.

The cinders A, discharged at 500° C. from pyrite roasting furnace, are fed through 1a into the fluidized bed reactor I where the preheating and the reduction occur. Into the bed of said reactor, fuel oil C is sent through 1c, while the fluidization is obtained by sending, through 1b, air B in an amount insufficient for the complete combustion of the oil to $H_2O$ and $CO_2$, thus producing a reducing gas containing CO and $H_2$.

After dust removal in I', the gases F can be introduced into the pyrite roasting furnace to utilize their residual calorific power and the sensible heat. The reduced and preheated cinders leaving I and I' are fed through 2a into the chlorinating layer II forming part of a two-stage fluidized bed reactor. Air B is sent (optionally preheated) through 3b, and chlorine D through 3d to the bottom of the lower layer III of the same reactor. In the layer II of the reactor, the exothermal oxidation to hematite of the reduced cinders prevailingly takes place, and the transformation of the nonferrous metal oxides into chlorides starts. This is completed in stage III.

The metal chlorides come out with the gases G, in the form of vapor. The gases G, after dust removal in II', are sent to IV where the metal chlorides are removed by moist way. The aqueous solution of chlorides H is subjected to hydrometallurgical treatment for the recovery of the nonferrous metals and the exhaust gases K are discharged to the atmosphere.

The pyrite cinders E, purified from Cu, Zn, Pb and the other nonferrous metals, are discharged from II' and from III through 3a and are available for the subsequent treatments (magnetizing reduction, arsenic removal, heat recovery, etc.).

The invention will now be described by some examples, which are illustrated but not limiting the invention.

EXAMPLE 1

1000 kg./h. of cinders discharged at 500° C. from a pyrite roasting furnace and having the following composition: total Fe=66%, total S=1.5%, Cu=0.2%, Zn=0.7%, As=0.01%, Ag=18 g./t., Au=2.3 g./t., are fed to a preheating and reducing fluidized bed reactor. Through the bottom of said reactor 80 Nm.³/h. of air are introduced, while 16 kg./h. of Bunker C fuel oil are injected into the fluid bed. The cinders are preheated to 700° C. and a 50% transformation of the hematite into magnetite is achieved.

The cinders are then fed continuously to a two-stage fluidized bed reactor, the upper stage of which is at 830° C. and the lower stage is at 740° C. Through the bottom of said reactor, 11.5 kg./h. of chlorine are introduced (the stoichiometric amount with respect to the nonferrous metals being 9.8 kg./h.) and 95 Nm.³/h. of air. Cu, Zn, Ag and Au are volatized with high yield and removed from the exhaust gases in a washing tower with continuous circulation, in the form of aqueous (molecular or colloidal) solution of chlorides. The solutions are subjected to hydrometallurgical treatment, with recovery of: 1.6 kg./h. of Cu in the form of Cu cement; 5.5 kg./h. of Zn in the calcined Zn oxide, 1.7 g./h. of Au in the Cu cement, 13 g./h. of Ag as Ag sponge. From the chlorination, 970 kg./h. of purified hematite cinders, containing 66.5% of Fe, 0.02% of Cu, 0.02% of Zn, are obtained. These are sent to the subsequent cooling operations, with recovery of 220 kg./h. of steam at 30 ata. and 300° C., and to pelletizing.

EXAMPLE 2

1000 kg./h. of cold pyrite cinders having the following composition:

Fe=57.2%, Cu=0.9%, Zn=2.6%, Pb=1.5 As=0.6% Ag=34 g./t., Au=1.7 g./t., are fed to a preheating and reducing two-stage reactor. The lower stage of said reactor is fed with 180 Nm.$^3$/h. of air and 33 kg./h. of Bunker C fuel oil. The cinders are preheated to 700° C. and a 95% transformation of the hematite into magnetite is achieved. Further 20 Nm.$^3$/h. of air are introduced into the upper layer. The gases leave the upper layer at about 300° C. The cinders coming out at 700° C., continuously feed a two-stage fluid-bed reactor, the upper stage of which is at 930° C. and the lower one at 820° C. Into the bottom of the said reactor, 48 kg./h. of chlorine are introduced (the stoichiometric amount being 43.5 kg./h. with respect to the non-ferrous metals) and 100 Nm.$^3$/h. of air. Cu, Zn, Pb, and Au are volatized with high yield and condensed as an aqueous acid solution of chlorides. This solution is subjected to hydrometallurgic treatment, with recovery of: 8 kg./h. of Cu in the form of cement; 1 g./h. of Au in the Cu cement; 23 kg./h. of Zn in the form of calcined ZnO; 11 kg./h. of Pb in the form of cement; 24 g./h. of Ag in the Pb cement. The hot and purified cinders are sent to the subsequent operation of magnetizing and arsenic removing reduction, to cooling and to magnetic enrichment. At the end, 770 kg./h. of magnetic concentrate are obtained, containing 67% of Fe, 0.018% of Cu, 0.022% of Zn, 0.031% of Pb and 0.012% of As.

The chlorine introduced in the lower, chlorinating chamber may be generated directly by decomposition of an appropriate metal, for instance, an alkaline-earth metal.

We claim:

1. A process for the purification of pyrite and pyrrhotite cinders for metallurgical utilization, by removal of non-ferrous metals such as copper, zinc, lead, gold, silver, nickel, cadmium, cobalt and manganese, and recovery thereof, which comprises:
   (a) heating and at least partial reduction to magnetite of the cinders by a carbonaceous fuel and air, at temperatures from 600° to 850° C.;
   (b) chlorination with chlorine and air, in absence of water at 650-950° C. of the hot cinders produced in (a), in a two-stage fluidized-bed reactor, wherein the chlorinating gas flows countercurrent to the cinders; and
   (c) wet removal of the metal chloride vapors with obtainment of aqueous solutions suitable for the recovery of the metals by conventional hydrometallurgical processes.

2. The process according to claim 1, wherein in stage (a) the preheating and the reduction are performed in a fluidized-bed furnace utilizing air and a fuel based on hydrocarbons which is directly injected into the reactor.

3. The process according to claim 1, wherein the reduction in stage (a) is performed by using a reducing gas from an external source.

4. The process according to claim 1, wherein the cinders in stage (a) are reduced to a reduction degree comprised between 20 and 100% with respect to the total reduction of hematite to magnetite.

5. The process according to claim 1, wherein the chlorination in stage (b) is performed in a reactor which is constituted of at least two consecutive fluidized-bed stages the lower stage of which is fed with a mixture of chlorine and air, wherein the chlorine is in proportion of 1 to 20% by volume, and the upper stage is fed with reduced hot cinders.

6. The process according to claim 1, wherein in stage (b), chlorine is generated directly in the lower, chlorinating bed by decomposition of a chloride of an appropriate metal, for instance of an alkaline-earth metal.

7. The process according to claim 1, wherein in stage (b), the total amount of chlorine introduced into the chlorinating reactor corresponds to the stoichiometric amount required for the formation of the nonferrous chlorides, with an excess of 5–20%.

8. The process according to claim 1, wherein in stage (b), the air sent to the chlorinating furnace is preheated by direct heat exchange with the hot cinders outcoming from the chlorination reactor.

9. The process according to claim 1, wherein in stage (c), the gases discharged from the chlorinating reactor are sent to a tower for the removal of the chlorides with circulation of aqueous solution of the said chlorides.

References Cited

UNITED STATES PATENTS

| | | | |
|---|---|---|---|
| 501,559 | 7/1893 | Chanute | 75—113 |
| 2,067,874 | 1/1937 | Brown et al. | 75—1 X |
| 2,094,275 | 9/1937 | Mitchell | 75—113 X |
| 2,681,855 | 6/1954 | Holmberg | 75—113 |
| 2,843,472 | 7/1958 | Eberhardt | 75—26 X |
| 2,870,003 | 1/1959 | Cavanagh | 75—26 |
| 3,227,545 | 1/1966 | Hildreth | 75—113 X |

FOREIGN PATENTS

| | | |
|---|---|---|
| 1,187,508 | 9/1959 | France. |

HYLAND BIZOT, Primary Examiner

E. L. WEISE, Asistant Examiner

U.S. Cl. X.R.

75—26, 113